United States Patent [19]

Takenoya et al.

[11] 4,141,305

[45] Feb. 27, 1979

[54] ELECTRONIC PATTERN CONTROL FOR A SEWING MACHINE

[75] Inventors: Hideaki Takenoya, Hachioji; Hachiro Makabe, Fussa, both of Japan

[73] Assignee: Janome Sewing Machine Co. Ltd., Tokyo, Japan

[21] Appl. No.: 820,393

[22] Filed: Jul. 29, 1977

[30] Foreign Application Priority Data

Jul. 30, 1976 [JP] Japan .................................. 51/90193

[51] Int. Cl.² ............................................. D05B 3/02
[52] U.S. Cl. ............................................... 112/158 E
[58] Field of Search .......... 112/158 E, 121.11, 121.12; 318/567, 569

[56] References Cited

U.S. PATENT DOCUMENTS

| | | | |
|---|---|---|---|
| 3,872,808 | 3/1975 | Wurst | 112/121.11 X |
| 3,965,830 | 6/1976 | Dorosz | 112/121.11 |
| 4,086,862 | 5/1978 | Makabe et al. | 112/158 E |

FOREIGN PATENT DOCUMENTS

2626322  4/1977  Fed. Rep. of Germany ....... 112/158 E

*Primary Examiner*—Peter Nerbun
*Attorney, Agent, or Firm*—Michael J. Striker

[57] ABSTRACT

A logic circuit generates in succession the stitch-control data for the successive stitches of a selected stitch pattern. The logic circuit does not store simultaneously all the stitch-control data for all the stitches of all the selectable stitch patterns, in the way done by conventional addressable random-access stitch-pattern memories. Instead, the logic circuit assumes successive states, in response to successive machine-synchronized pulses. In each state it generates, in the sense of bringing into existence for the first time, stitch-control data for the next stitch to be produced, this stitch-control data being derived from data related to a preceding stitch, e.g., the stitch-control data for the preceding stitch. The number of logic elements needed is low compared to that needed for a random-access stitch-pattern memory of the type storing all the stitch-control data for all the stitches of all the selectable patterns.

10 Claims, 9 Drawing Figures

FIG_1

FIG. 3

| a | i | j | k (ℓ = Time n) | | | | | | | | k (m = Time n+1) | | | | | | | | n (0 2 4 6) |
|---|---|---|---|---|---|---|---|---|---|---|---|---|---|---|---|---|---|---|---|
| b | 1 | 0 | 0 | 0 | 0 | 0 | 0 | 0 | 0 | 0 | 0 | 0 | 1 | 1 | 0 | 0 | 0 | |
|   | 2 | 24 | 0 | 0 | 0 | 1 | 1 | 0 | 0 | 0 | 0 | 0 | 0 | 0 | 0 | 0 | 0 | |
| c | 3 | 32 | 0 | 0 | 1 | 0 | 0 | 0 | 0 | 0 | 0 | 0 | 1 | 0 | 1 | 1 | 0 | 0 |
|   | 4 | 44 | 0 | 0 | 1 | 0 | 1 | 1 | 0 | 0 | 0 | 0 | 1 | 1 | 1 | 0 | 0 | 0 |
|   | 5 | 56 | 0 | 0 | 1 | 1 | 1 | 0 | 0 | 0 | 0 | 0 | 1 | 0 | 1 | 1 | 0 | 1 |
|   | 6 | 45 | 0 | 0 | 1 | 0 | 1 | 1 | 0 | 1 | 0 | 0 | 1 | 0 | 0 | 0 | 0 | 0 |
| d | 7 | 64 | 0 | 1 | 0 | 0 | 0 | 0 | 0 | 0 | 1 | 0 | 0 | 0 | 0 | 0 | 0 | 1 |
|   | 8 | 65 | 0 | 1 | 0 | 0 | 0 | 0 | 0 | 1 | 1 | 0 | 1 | 0 | 0 | 0 | 1 | 0 |
|   | 9 | 66 | 0 | 1 | 0 | 0 | 0 | 0 | 1 | 0 | 1 | 0 | 1 | 0 | 0 | 0 | 1 | 1 |
|   | 10 | 67 | 0 | 1 | 0 | 0 | 0 | 0 | 1 | 1 | 1 | 0 | 1 | 0 | 0 | 0 | 0 | 1 |
|   | 11 | 96 | 0 | 1 | 1 | 0 | 0 | 0 | 0 | 0 | 1 | 0 | 1 | 0 | 0 | 0 | 0 | 1 |
|   | 12 | 97 | 0 | 1 | 1 | 0 | 0 | 0 | 0 | 1 | 1 | 0 | 1 | 0 | 0 | 0 | 1 | 0 |
|   | 13 | 98 | 0 | 1 | 1 | 0 | 0 | 0 | 1 | 0 | 1 | 0 | 1 | 0 | 0 | 0 | 1 | 1 |
|   | 14 | 99 | 0 | 1 | 1 | 0 | 0 | 0 | 1 | 1 | 1 | 0 | 1 | 1 | 1 | 0 | 0 | 0 |
|   | 15 | 120 | 0 | 1 | 1 | 1 | 1 | 0 | 0 | 0 | 1 | 0 | 0 | 0 | 0 | 0 | 0 | 0 |
| e | 16 | 128 | 1 | 0 | 0 | 0 | 0 | 0 | 0 | 0 | 1 | 0 | 0 | 1 | 1 | 0 | 0 | 0 |
|   | 17 | 152 | 1 | 0 | 0 | 1 | 1 | 0 | 0 | 0 | 1 | 0 | 0 | 0 | 0 | 0 | 0 | 1 |
|   | 18 | 129 | 1 | 0 | 0 | 0 | 0 | 0 | 0 | 1 | 1 | 0 | 0 | 1 | 1 | 0 | 0 | 1 |
|   | 19 | 153 | 1 | 0 | 0 | 1 | 1 | 0 | 0 | 1 | 1 | 0 | 0 | 0 | 0 | 1 | 0 | 1 |
|   | 20 | 130 | 1 | 0 | 0 | 0 | 0 | 0 | 1 | 0 | 1 | 0 | 0 | 1 | 1 | 0 | 1 | 0 |
|   | 21 | 154 | 1 | 0 | 0 | 1 | 1 | 0 | 1 | 0 | 1 | 0 | 0 | 0 | 0 | 1 | 1 | 1 |
|   | 22 | 131 | 1 | 0 | 0 | 0 | 0 | 0 | 1 | 1 | 1 | 0 | 0 | 1 | 0 | 1 | 1 | 0 |
|   | 23 | 155 | 1 | 0 | 0 | 1 | 1 | 0 | 1 | 1 | 1 | 0 | 1 | 0 | 0 | 0 | 0 | 0 |
|   | 24 | 160 | 1 | 0 | 1 | 0 | 0 | 0 | 0 | 0 | 1 | 0 | 1 | 0 | 0 | 0 | 0 | 0 |
|   | 25 | 168 | 1 | 0 | 1 | 0 | 1 | 0 | 0 | 0 | 1 | 0 | 1 | 0 | 0 | 0 | 0 | 0 |
| f | 26 | 192 | 1 | 1 | 0 | 0 | 0 | 0 | 0 | 0 | 1 | 1 | 0 | 1 | 1 | 0 | 0 | 0 |
|   | 27 | 216 | 1 | 1 | 0 | 1 | 1 | 0 | 0 | 0 | 1 | 1 | 0 | 0 | 0 | 0 | 0 | 1 |
|   | 28 | 193 | 1 | 1 | 0 | 0 | 0 | 0 | 0 | 1 | 1 | 1 | 0 | 1 | 1 | 0 | 0 | 1 |
|   | 29 | 217 | 1 | 1 | 0 | 1 | 1 | 0 | 0 | 1 | 1 | 1 | 0 | 0 | 0 | 0 | 1 | 0 |
|   | 30 | 194 | 1 | 1 | 0 | 0 | 0 | 0 | 1 | 0 | 1 | 1 | 0 | 1 | 1 | 0 | 1 | 0 |
|   | 31 | 218 | 1 | 1 | 0 | 1 | 1 | 0 | 1 | 0 | 1 | 1 | 0 | 0 | 0 | 1 | 1 | 0 |
|   | 32 | 195 | 1 | 1 | 0 | 0 | 0 | 0 | 1 | 1 | 1 | 1 | 0 | 1 | 0 | 0 | 1 | 1 |
|   | 33 | 219 | 1 | 1 | 0 | 1 | 1 | 0 | 1 | 1 | 1 | 1 | 1 | 0 | 0 | 0 | 0 | 0 |
|   | 34 | 240 | 1 | 1 | 1 | 1 | 0 | 0 | 0 | 0 | 1 | 1 | 0 | 1 | 1 | 0 | 1 | 1 |
| g | | | 1 | 2 | 3 | 4 | 5 | 6 | 7 | 8 | 1 | 2 | 3 | 4 | 5 | 6 | 7 | 8 |
| h | | | A | B | C | D | E | F | G | H | A | B | C | D | E | F | G | H | a: Pattern Types  b: Basic Zigzag Stitches  c: Three Point Zigzag Stitches  d: Blind Stitches  e: Buttonhole: Forward Stitches  f: Buttonhole: Rearward Stitches  g: Bit No.  h: Flip-Flops  i: Table No.  j: Decimal Codes  k: Binary Codes  ℓ: Time n  m: Time n+1  n: Needle Position Co-ordinate

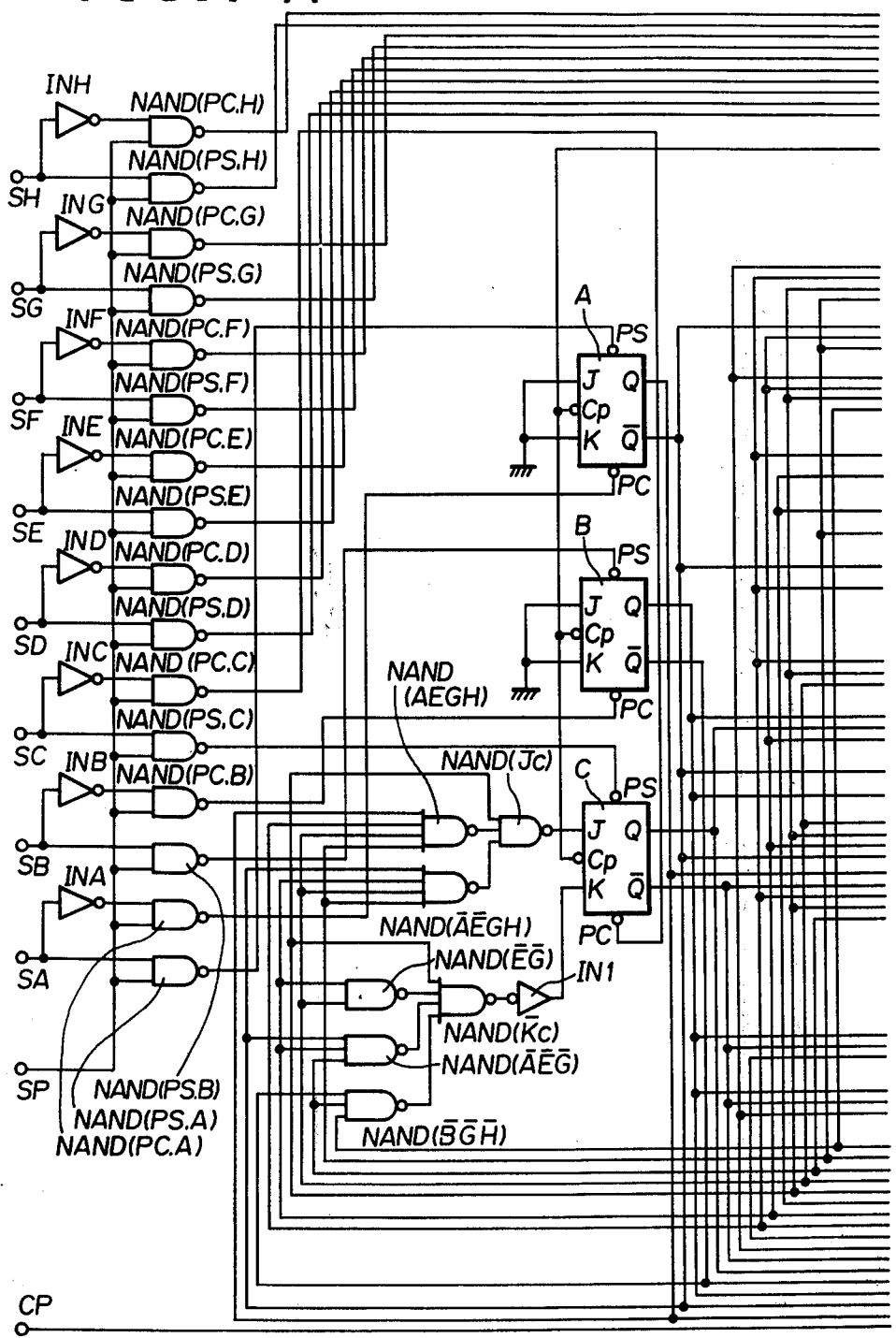
FIG. 7-A

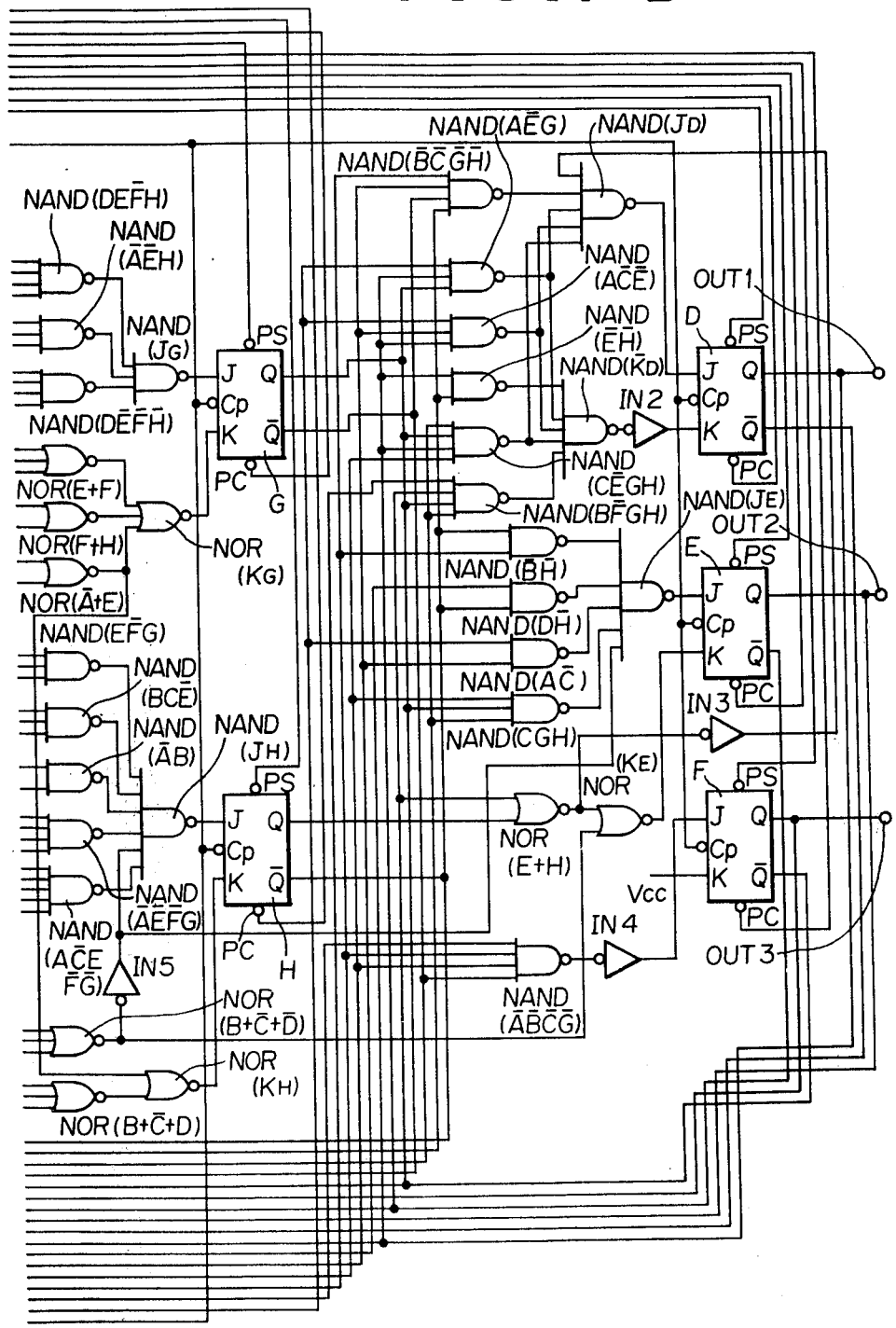
FIG_7-B

ELECTRONIC PATTERN CONTROL FOR A SEWING MACHINE

BRIEF DESCRIPTION OF THE INVENTION

The invention relates to a sewing machine having an electronic control device for controlling the stitch forming instrumentalities of the sewing machine, changing the relative positions of the needle and the material to be sewn, thereby to form stitch patterns on the sewn material. The electronic control device includes a logic circuit giving a stitch control signal each time it receives a signal per rotation of the sewing machine. Such a logic circuit can store a lot of informations for controlling and producing various type of stitch patterns, and thus can be easily installed in a limited space in the sewing machine.

Conventional sewing machines have generally been provided with a mechanical information storing device such as pattern cams and cam followers to control the stitch forming instrumentalities to form stitch patterns. Therefore in the prior art, the sewing machine required many pattern cams in order to produce many stitch patterns, and the space in a sewing machine is limited to accommodate such a number of pattern cams, and also the weight of the sewing machine increases. The pattern cams and cam followers as a pattern generating device may be replaced by a tape storing many stitch control signals. However a separate and bulky drive mechanism is required to read out the signals from such a tape. In any event, conventional sewing machines remain to be improved in structure as well as operation for producing stitch patterns of many types.

The present invention has been devised to eliminate the shortcomings and disadvantages of the prior art. Namely it is a primary object of the invention to provide a sewing machine with an electronic logic circuit for controlling the formation of various stitches of the sewing machine;

It is another object of the invention to provide an electronic logic circuit of few components storing a lot of informations for controlling the formation of stitches;

It is another object of the invention to provide an electronic device easily and accurately operated to produce stitch patterns; and It is another object of the invention to provide an electronic control device, small and compact to be accommodated in a limited space in the sewing machine.

Other advantages of the invention will be apparent from the following description of the invention in reference to the preferred embodiment shown in the attached drawings; in which, FIG. 1 shows the basic organization of this invention, FIG. 2 shows the main parts of a sewing machine embodying the invention, FIG. 3 shows a table of encoded data for a logic circuit of the invention, FIGS. 4, 5 and 6 show Veitch tables in accordance with the invention, FIG. 7 shows an embodiment of a logic circuit of the invention, and FIG. 8 shows an electric control circuit of the invention.

DETAILED DESCRIPTION OF THE INVENTION

Figure 1:
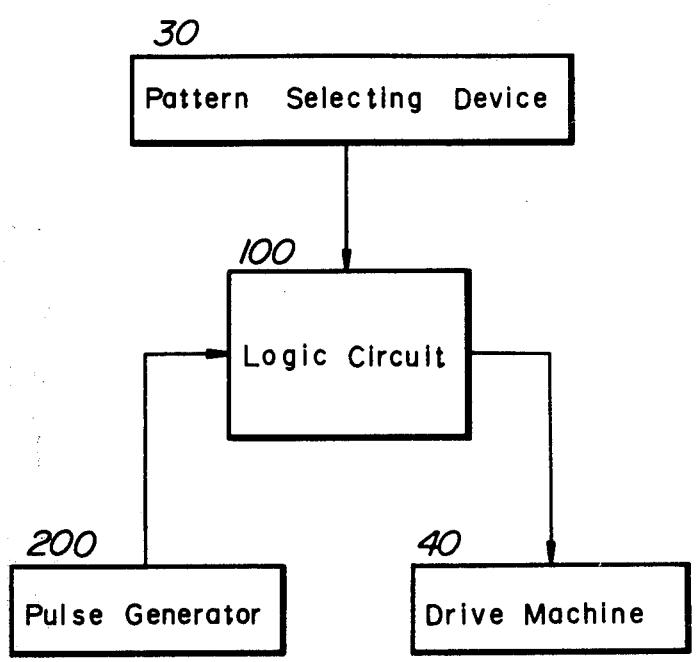

In FIG. 1 showing the basic structure of the invention, reference numeral (200) is a pulse generator, numeral (30) is a pattern selecting device, numeral (100) is a logic circuit, and numeral (40) is a drive mechanism of a sewing machine. The logic circuit is so structured as to respond to selected patterns to be sewn, and is to give stitch control signals to the drive mechanism each time the logic circuit receives signals from the pattern selecting device and from the pulse generator which is operated in synchronism with the rotation of the sewing machine.

Figure 2:
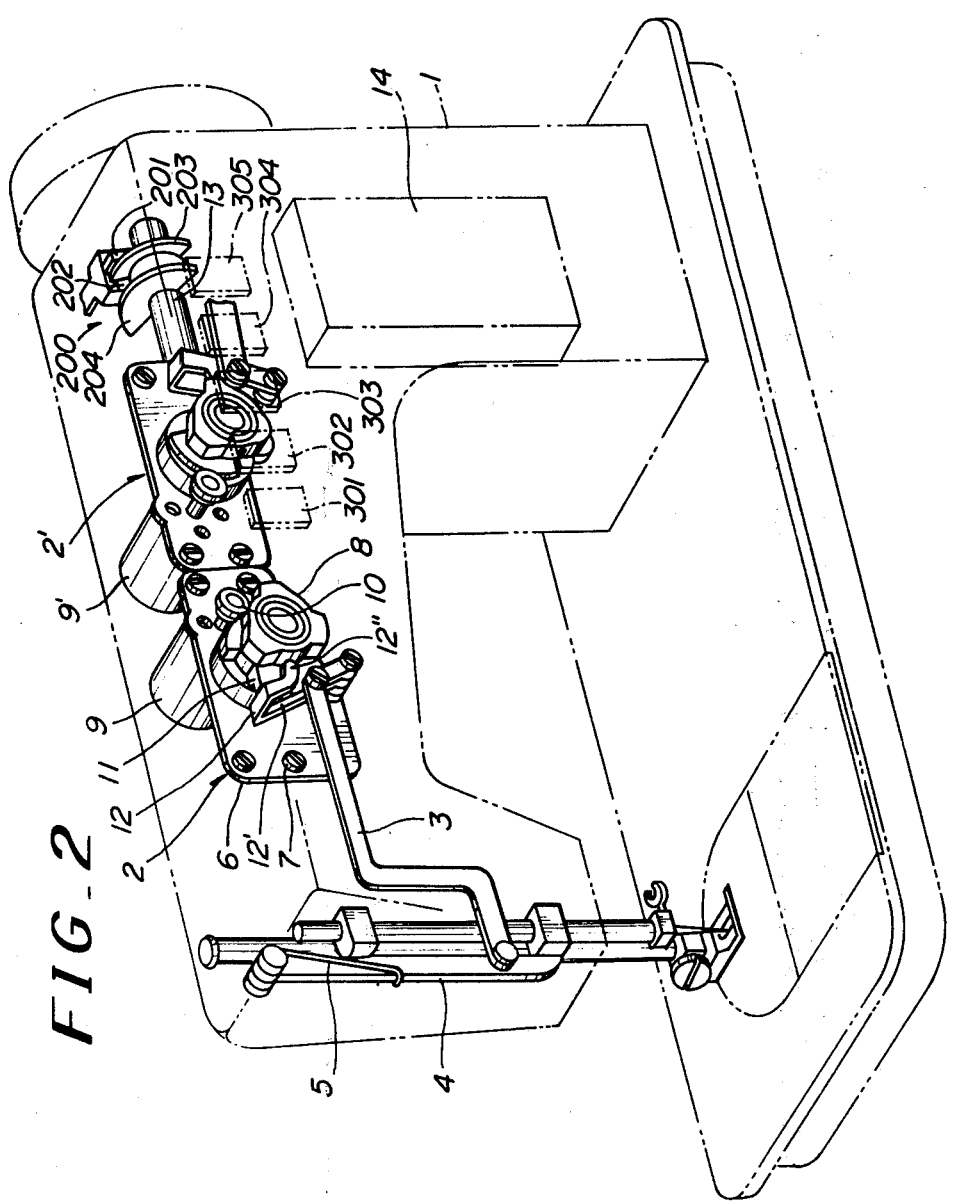

In FIG. 2, reference numeral (1) is a machine housing. Numerals (2), (2') show electro-mechanical link mechanisms for controlling the needle swinging amplitude and the feeding amount respectively. These electro-mechanical link mechanisms constitute the drive mechanism (40) in FIG. 1. The output of the link mechanism (2) is transmitted via a transmission rod (3) to the needle bar support (4) which is biased in one direction by a torsion spring (5) and is laterally swingable while the needle bar is vertically reciprocated in the support (4) by the main shaft (13) of the sewing machine. The output of the link mechanism (2') is transmitted to the feed adjusting mechanism (not shown) in the generally known manner to control the operation of the feed dog (not shown).

As the needle and feed control mechanisms (2, 2') are of the same structure, it will be enough to describe the details of one of these mechanisms, namely the needle control mechanism (2). In reference to FIG. 2, a bracket (6) is fixedly arranged in the machine housing (1). On the bracket, a needle positioning cam (11) is rotatably mounted. The cam (11) is rotated by an electromagnetic driver (9) which has a central rotary shaft provided with a gear (10) engaging the cam (11) to rotate the same. The needle positioning cam (11) is engaged by a follower (12') of a U-shaped follower member (12) which is connected to one end of the transmission rod (3) which is under the influence of the torsion spring (5). A releasing cam (8) is also rotatably mounted on the bracket (6) coaxially with the needle positioning cam (11), and is rotated by the main shaft (13) of the sewing machine. The releasing cam is engaged by another follower (12") of the follower member (12), and operates to release the follower (12') of the follower member (12) from the needle positioning cam (11) when the electromagnetic driver (9) receives a signal to rotate the needle positioning cam (11). When the follower (12") engages one of the recesses of the releasing cam (8), the electromagnetic driver (9) receives no signals. Therefore, the needle positioning cam (11) is no more rotated, and the needle position is determined by the cam (11).

Reference numeral (200) is a pulse generator, which is composed of a Hall IC (201) fixedly arranged in the machine housing (1), a permanent magnet (202) fixedly arranged opposite to the Hall IC and a screening member mounted on the main shaft (13) for rotation therewith and having a pair of spaced screen segments (203, 204). The segment (203) is rotated between the Hall IC (201) and the permanent magnet (202), and the segment (204) is rotated adjacent the permanent magnet (202) as shown. When the screen segment (203) is located between the Hall IC (201) and the permanent magnet (202) during rotation of the screening member, the Hall IC gives no output. If the screen segment (203) passes out of the space between the Hall IC and the permanent magnet, the Hall IC gives a signal in the form of a symmetrical rectangular wave. Namely the Hall IC gives one signal per rotation of the main shaft.

Reference numerals (301) to (305) indicate push button switches for selecting patterns to be sewn, which constitute main parts of the pattern selecting device (30) in FIG. 1. Numeral (14) indicates a control box in which the logic circuit (100) and a drive circuit (400) for the drive mechanism (40) are arranged.

Now, the details of the pattern selecting device (30) and the logic circuit (100) will be described, but for convenience of explanation it must be stated first of all that the sewing machine is provided with pattern data as shown in FIG. 3 for five stitch patterns, namely basic zigzag stitches, three pointed zigzag stitches, blind stitches, forward stitches for a buttonhole and rearward stitches for a button-hole which are selected by the respective five push button switches (301–305).

In reference to FIG. 3, if the bit No. 4, 5 and 6 of the binary codes correspond to the needle position coordinates, the needle position coordinates are determined by the codes as shown. Namely, the left end coordinate 0 of the needle swinging movement is determined by the binary codes 0 0 0, and the right end coordinate 6 is determined by the binary code 1 1 0. Bit No. 1, 2 and 3 are used to select patterns when the pattern selecting switches (301–305) are operated. The bit No. 1, 2 and 3 are also utilized to repeatedly sew predetermined stitches after the preceding stitches have been formed in one selected pattern. This will realize the stitch patterns which will never be obtained by generally used pattern cams. Bit No. 7 and 8 are used to avoid the repeated usage of the same code in a pattern which requires repetition of the same needle position coordinate more than once.

Time (n) and time (n+1) of the binary codes are indicated on the same line. Namely the preceding and the following stitch signals are indicated in the same lines, and the stitch signals of time (n+1) are always arranged in the next line of time (n). The decimal codes respectively correspond to the binary codes of time (n). Table No. 1–34 have been used to make it easy to understand the table in FIG. 3. Regarding the repetition of stitches, for example, of the three pointed zigzag stitches, each stitch is required to return from table No. 6 to table No. 3 after the stitches have been made through table No. 3–5. However, regarding the forward stitches of a buttonhole, the bartack stitches of needle position coordinates 0 and 6 are repeatedly formed in a predetermined number, and then the left side line-tack stitches of needle position coordinates 0 and 2 are repeatedly formed in a desired number in accordance to the size of the buttonhole. Therefore the stitches have reached to the table No. 25 from the table No. 16, the next stitch is required to return to the table No. 24, and then table No. 24 and 25 must be repeated. Regarding the rearward stitches of a buttonhole, the stitches of the needle position coordinates in FIG. 3 are accompanied by reversed feeding and proceed up from the bottom with the progress of the following table Numbers as shown.

If the binary codes in FIG. 3 are generated by the logic circuit including J-K flip-flop circuits, the following proposition is needed to explain the embodiment of the invention. As shown in FIG. 3, the eight flip-flop circuits are indicated (A) to (H) when these flip-flop circuits are in a set condition, namely the true side output terminals (Q) of these flip-flop circuits have a logic value 1. On the other hand, these flip-flop circuits are indicated ($\bar{A}$) to ($\bar{H}$) when these flip-flop circuits are in a reset condition, namely the true side output terminals (Q) of the flip-flop circuits have a logic value 0.

The decimal codes are 0 to 240 and the total number is 34. The binary codes which are not indicated or skipped in FIG. 3 are prohibited in the expressions of binary codes which are made by combinations of variables as will be explained below. This will serve to simplify the characteristic equations which will be set forth, and also to simplify the logic circuit of the invention.

Figure 4:
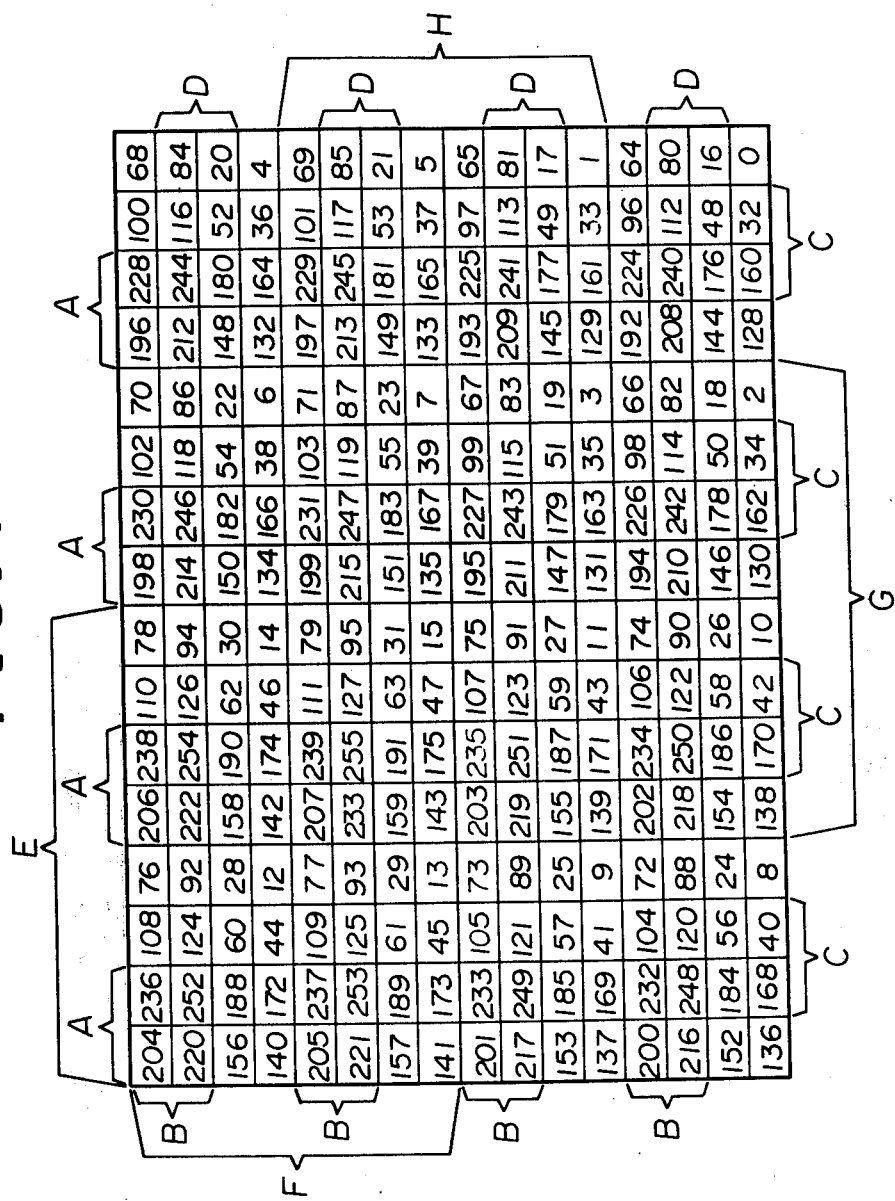
Figure 5:
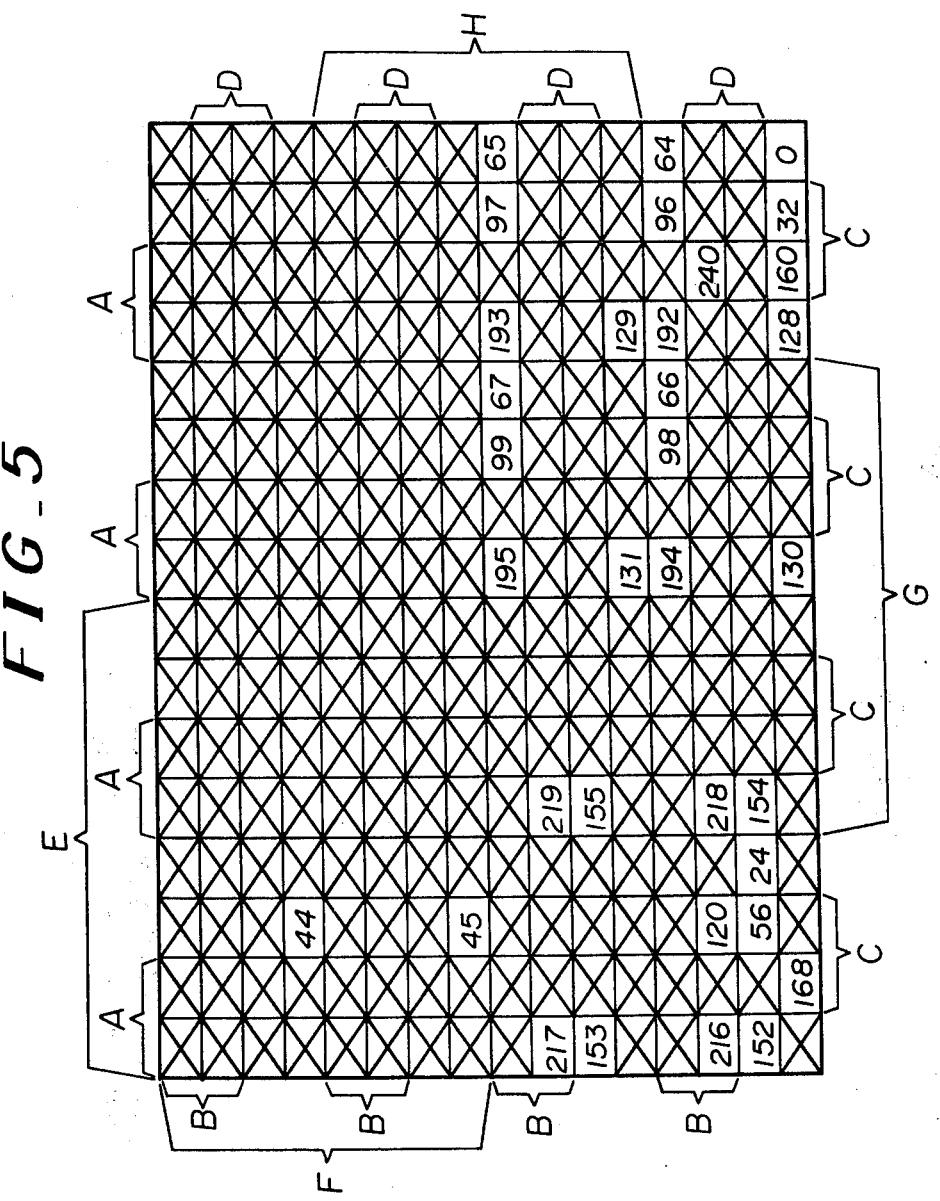

Each of the decimal codes 0 to 240 including the skipped or prohibited codes can be expressed by one of $2^8 = 256$ binary codes in combinations of letters A to H and $\bar{A}$ to $\bar{H}$. But these letters A to H and $\bar{A}$ to $\bar{H}$ shall never be simultaneously combined and also the same letters shall never be simultaneously combined. These binary codes can be arranged in a table generally known as Veitch table in FIG. 4. The binary codes (1) to (256) in the table are related to any of the letters (A) to (H) which are arranged outside of the table. Namely when the letter F is related to the binary codes in the first to eighth lines as shown by way of example, these binary codes are so arranged to make 1 in the predetermined decimal lines of the flip-flop F in the bit No. 6 in FIG. 3. The binary codes which are not related to F are so arranged to make 0 in the same lines of No. 6 in FIG. 3. In the same manner, the individual codes are arranged in relation to letters F to H in the decimal numeration including the aforementioned prohibited codes in FIG. 4. FIG. 5 shows a table in which all the codes, except for the 34 decimal codes in FIG. 3, are eliminated.

If a characteristic equation is to be sought by way of Boolean algebra in order to express the outputs of the flip-flop circuits (A) to (H) in the time (n+1) by means of the functions of these flip-flops in the time (n), the output of the flip-flop circuit (A), for example, in the time (n+1) can be expressed by a formula ($A^{n+1}$), and the condition that the formula ($A^{n+1}$) becomes 1 can be sought by way of the condition of flip-flop circuit (A) in the time (n); namely if the code elements of the codes including 1 in the time (n+1) and in the decimal lines of A in FIG. 3 are pool variables (A to H and $\bar{A}$ to $\bar{H}$), the condition to be sought will be the functions obtained by the table addition of the pool variables after they have been multiplied, namely, $$A^{n+1} = [A\overline{BCDEFGH} + A\overline{BCDEFGH} +$$
$$A\overline{BCDEFGH} + A\overline{BCDEFGH} + A\overline{BCDEFGH} +$$
$$A\overline{BCDEFGH} + A\overline{BCDEFGH} + A\overline{BCDEFGH} +$$
$$A\overline{BCDEFGH} + A\overline{BCDEFGH} + A\overline{BCDEFGH} +$$
$$AB\overline{CDEFGH} + AB\overline{CDEFGH} + AB\overline{CDEFGH} +$$
$$AB\overline{CDEFGH} + AB\overline{CDEFGH} + AB\overline{CDEFGH} +$$
$$AB\overline{CDEFGH} + ABCDEF\overline{GH}]^n \quad \text{(formula 1)}.$$

Figure 6:
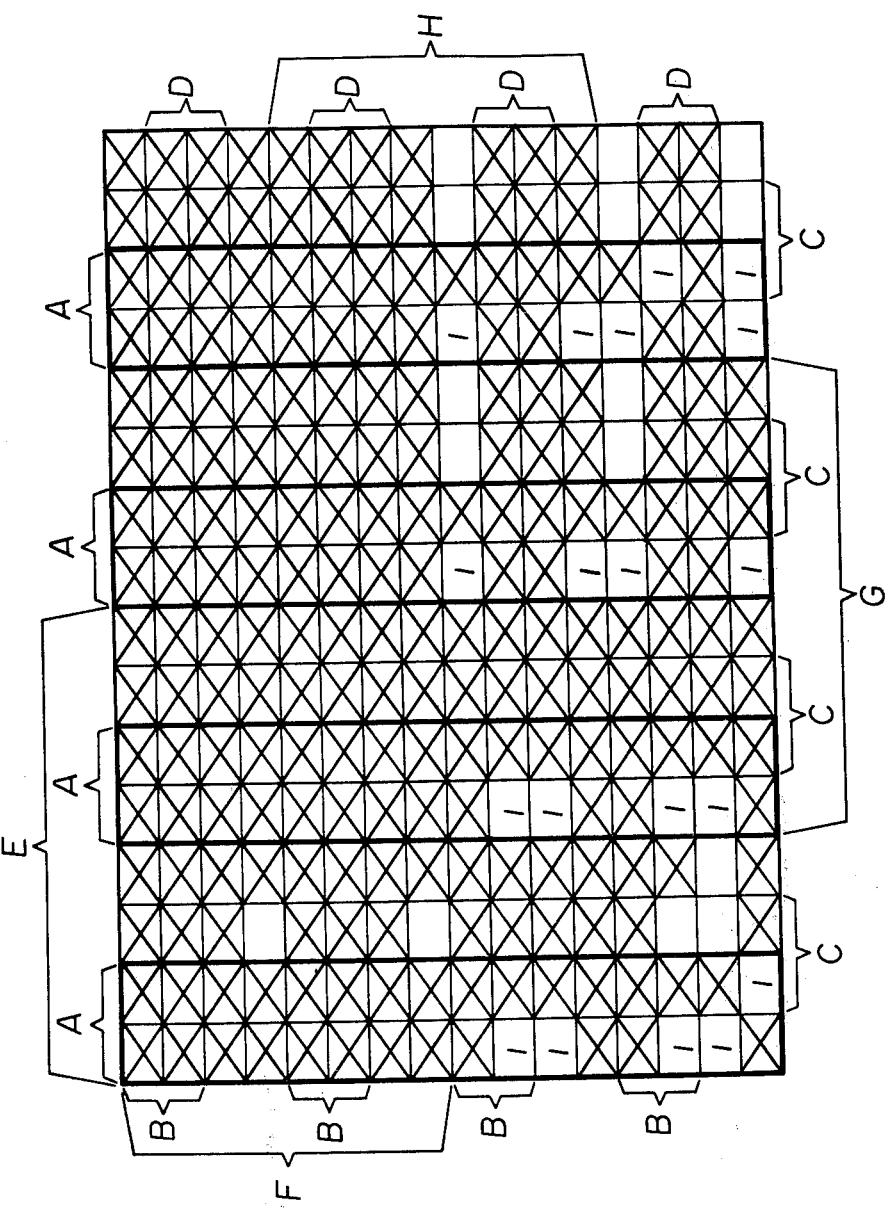

For the purpose of simplifying the formula 1, the table in FIG. 6 has been provided, in which numeral "1" is applied to the binary codes in FIG. 5 which have been used in the formula 1 and a blank is applied to the binary codes which have not been used in the formula. As is apparent from FIG. 6, the formula 1 ($A^{n+1}$) is included in all the regions enclosed by thicker lines. This can be expressed, by way of Boolean algebra, in a simplified formula of fewest possible variables including the Boolean variables A and $\bar{A}$. All areas enclosed by thicker lines are in A lines and include no blanks. Namely since there is no $\bar{A}$, or $\bar{A}=0$ in FIG. 6, $$A^{n+1} = A^n \quad \text{(formula 2)}$$

after all. The formula 1 consists of long terms. Therefore a control circuit for controlling such combinations of elements will require many parts which will a complex arrangement for the circuit. The simplified formula 2 is, however, composed of one term with one variable, and is controllable by a control circuit of a simple structure.

In the same manner, simplified formulas can be obtained with respect to the flip-flop circuits (B) to (H) as follows:

$$B^{n+1} = B^n$$

$$C^{n+1} = \{C(F+\overline{E}G+\overline{BGH}+\overline{AEG}) + \overline{C}(F+AEGH+\overline{AEGH})\}^n$$

$$D^{n+1} = \{D(A\overline{E}G+A\overline{CE}+\overline{EH}+CEGH+B\overline{F}GH) + \overline{D}(A\overline{E}G+\overline{H}F+A\overline{CE}+\overline{BCGH}+CEGH)\}^n$$

$$E^{n+1} = \{E(F\overline{H}+\overline{B}CD) + \overline{E}(\overline{BF}+D\overline{H}+A\overline{C}+CGH+BCD)\}^n$$

$$F^{n+1} = (\overline{ABCGH})^n$$

$$G^{n+1} = \{G(\overline{EF}+\overline{FH}+A\overline{E}) + \overline{G}(DE\overline{F}H+\overline{AEH}+D\overline{EFH})\}^n$$

$$H^{n+1} = \{H(A\overline{E}+\overline{B}CD) + \overline{H}(BC\overline{E}+\overline{AEFG}+E\overline{F}G+A\overline{C}E\overline{F}G+\overline{B}CD+\overline{A}B)\}^n$$

With respect to the simplified formulas, the J-K flip-flop circuits (A) to (H) are used to give the outputs on the left side of the formulas from the inputs on the right side of the formulas. Provided that the outputs of the flip-flop circuits are $Q^n$ in the time (n) and any one of the flip-flop circuits in FIG. 7 has a clock pulse applied to the trigger terminal ($C_p$) in the time (n+1), then the output ($Q^n$) of the output terminal (Q) is unchanged relative to the time (n) if the terminals (J), (K) are logic values 0, 0 respectively at the time of application of the clock pulse, the output terminal (Q) becomes 0 if the terminals (J), (K) are 0, 1 respectively at the time of application of the clock pulse, and becomes 1 if the terminals (J), (K) are 1, 0 respectively at the time of application of the clock pulse, and becomes $\overline{Q}^n$ if the terminals (J), (K) are 1, 1 respectively at the time of application of the clock pulse, namely the output of the flip-flop circuit is inverted at this time. All these conditions can be expressed by Boolean algebra, namely in the formula, $Q^{n+1} = (\overline{K}Q+J\overline{Q})^n$. If K and J are replaced by the logic values 0, 1 in this formula, the right side becomes $(Q+\overline{Q})^n$, and the addition of Q and its complement $\overline{Q}$ is 1 in accordance with the Boolean axiom. In the same manner, the formula $Q^{n+1} = (\overline{K}Q+J\overline{Q})^n$ can be satisfied.

If the values J, K are to be sought from the formula $Q^{n+1} = (\overline{K}Q+J\overline{Q})^n$ by replacing Q and its complement $\overline{Q}$ by respective ones of A to H and their complements A to H, then the inputs $J_A$, $K_A$ of the flip-flop circuit (A), for example, can be obtained from the comparison between the formula $A^{n+1} = (\overline{K}A+J\overline{A})^n$ and the formula 2, $A^{n+1} = A^n$, in which letters A to H annexed to J and K correspond to the respective flip-flop circuits. Namely $\overline{K}_A=1$, and the complements of both sides are $K_A=0$, and since the formula 2, $A^{n+1}=A^n$ includes no terms of $\overline{A}$, $J_A=0$ can be obtained. In the same manner, the values of $J_B$ to $J_H$ and of $K_B$ to $K_H$ can be obtained. For example, from the formula $C^{n+1}$, $\overline{K}_C=(F+\overline{E}G+\overline{BGH}+\overline{AEG})$ can be sought, and the complements of both sides are $K_C=\overline{(F+\overline{E}G+\overline{BG}\cdot\overline{H}+\overline{AEG})} = \overline{F}(E+\overline{G}XB+G+H)(A+E+G)$ in accordance with the axiom of De Morgan. As a result, the following functions can be obtained;

$$J_A = 0, K_A = 0$$

$$J_B = 0, K_B = 0$$

$$J_C = F+AEGH+\overline{AEGH}$$

$$K_C = \overline{F}(E+\overline{G})(B+G+H)(A+E+G)$$

$$J_D = A\overline{E}G+\overline{H}F+A\overline{CE}+\overline{BCGH}+CEGH$$

$$K_D = (\overline{A}+E+\overline{G})(\overline{A}+C+E)(E+H)(-\overline{C}+E+\overline{G}+H)(B+F+\overline{G}+\overline{H})$$

$$J_E = \overline{BH}+D\overline{H}+A\overline{C}+CGH+BCD$$

$$K_E = (\overline{F}+H)(B+\overline{C}+\overline{D})$$

$$J_F = \overline{ABCG}, K_F = 1$$

$$J_G = DE\overline{F}H+\overline{AEH}+D\overline{EFH}$$

$$K_G = (E+F)(F+H)(\overline{A}+E)$$

$$J_H = BC\overline{E}+\overline{AEFG}+E\overline{F}G+A\overline{C}E\overline{F}G+\overline{B}CD+\overline{A}B$$

$$K_H = (\overline{A}+E)(B+\overline{C}+D)$$

FIG. 7 shows an electric circuit so formed as to satisfy the functions $J_A$ to $J_H$ and $K_A$ to $K_H$. In this circuit, since the terminals ($J_A$), ($K_A$), ($J_B$), ($k_B$) of the flip-flop circuits (A) to (H) have the logic values 0 at all times as abovementioned, these terminals are grounded. The letters A and B annexed to J and K indicate the corresponding flip-flop circuits. The terminal ($K_F$) has a logic value 1 at all times and is connected to the control DC power source (Vcc). For example, regarding the NAND circuit (NAND($J_C$)), the first input terminal of the circuit receives a datum ($\overline{F}$) from the complement side output terminal ($\overline{Q}$) of the flip-flop circuit (F); the input side terminals of the NAND circuit (NAND(A-EGH)) receive the data (A), (E), (G), (H) respectively from the true side output terminals (Q) of the flip-flop circuits (A), (E), (G), (H) so as to apply the complement ($\overline{AEGH}$) of the product (AEGH) of the Boolean variables (A, E, G, H) to the second input terminal of the NAND circuit (NAND($J_C$)); and the input side terminals of the NAND circuit (NAND($\overline{AEGH}$)) receive the data ($\overline{A}$), ($\overline{E}$) respectively from the complement side output terminals ($\overline{Q}$) of the flip-flop circuits (A), (E) and also receive the data (G), (H) respectively from the true side output terminals (Q) of the flip-flop circuits (G), (H) so as to apply the compliment ($\overline{\overline{AEGH}}$) of the product ($\overline{AEGH}$) of the Boolean valiables ($\overline{A}$, $\overline{E}$, G, H) to the third input of the NAND circuit (NAND($J_C$)). Thus the output terminal ($J_C$) of the NAND circuit (NAND($J_C$)) gives the output (F+AEGH+$\overline{AEGH}$) which is the compliment of the product $\overline{F}$ ($\overline{AEGH}$) ($\overline{\overline{AEGH}}$) of the Boolean variables.

In the same manner, the NAND circuits represented by the multiplications of letters (A) to (H) and ($\overline{A}$) to ($\overline{H}$) have their input terminals connected to the output terminals of the flip-flop circuits of the same letters (A) to (H); for example the NAND circuit ($D\overline{D}$) has the input terminals connected respectively to the output terminals (Q), ($\overline{Q}$) of the flip-flop circuit (D). In the same manner, the NOR circuits represented by the additions of (A) to (H) and (Ā) to (H̄) have their input terminals connected to the output terminals of the flip-flops of the corresponding letters (A) to (H). The NAND circuits or the NOr circuits having letters (C), (D), (E), (G), (H) annexed to the letter (J) or (K) have output terminals connected to the output terminals (J) or (K) of the flip-flop circuit of the corresponding letters (C), (D), (E), (G), (H). The NAND circuits (NAND($\overline{K}_C$)), (NAND($\overline{K}_D$)) have their output terminals connected to the inputs (K) of the flip-flop circuits (C), (D) respectively through the respective inverters (IN 1), (IN 2).

The NAND circuits or the NOR circuits connected to the input terminals (J) or (K) of the flip-flop circuits (A) to (H) are so arranged to have the output of the values sought hereinbefore regarding $J_A$ to $J_H$ and $K_A$ to $K_H$. The flip-flop circuit (F) has a terminal (J) connected to the output of the NAND circuit (NAND ($\overline{ABCG}$)) in an inverted condition. As shown in FIG. 7, each of the flip-flop circuits (A) to (H) has input terminals (J), (K) each connected to receive a combination of data from one or a plurality of other flip-flop circuits, or fixedly grounded, or connected to the control power source (Vcc). In such an arrangement of the flip-flop circuits, the output of one flip-flop circuit in the time (n+1) is determined by the informations in the time (n) of the other flip-flop circuits.

Figure 8:
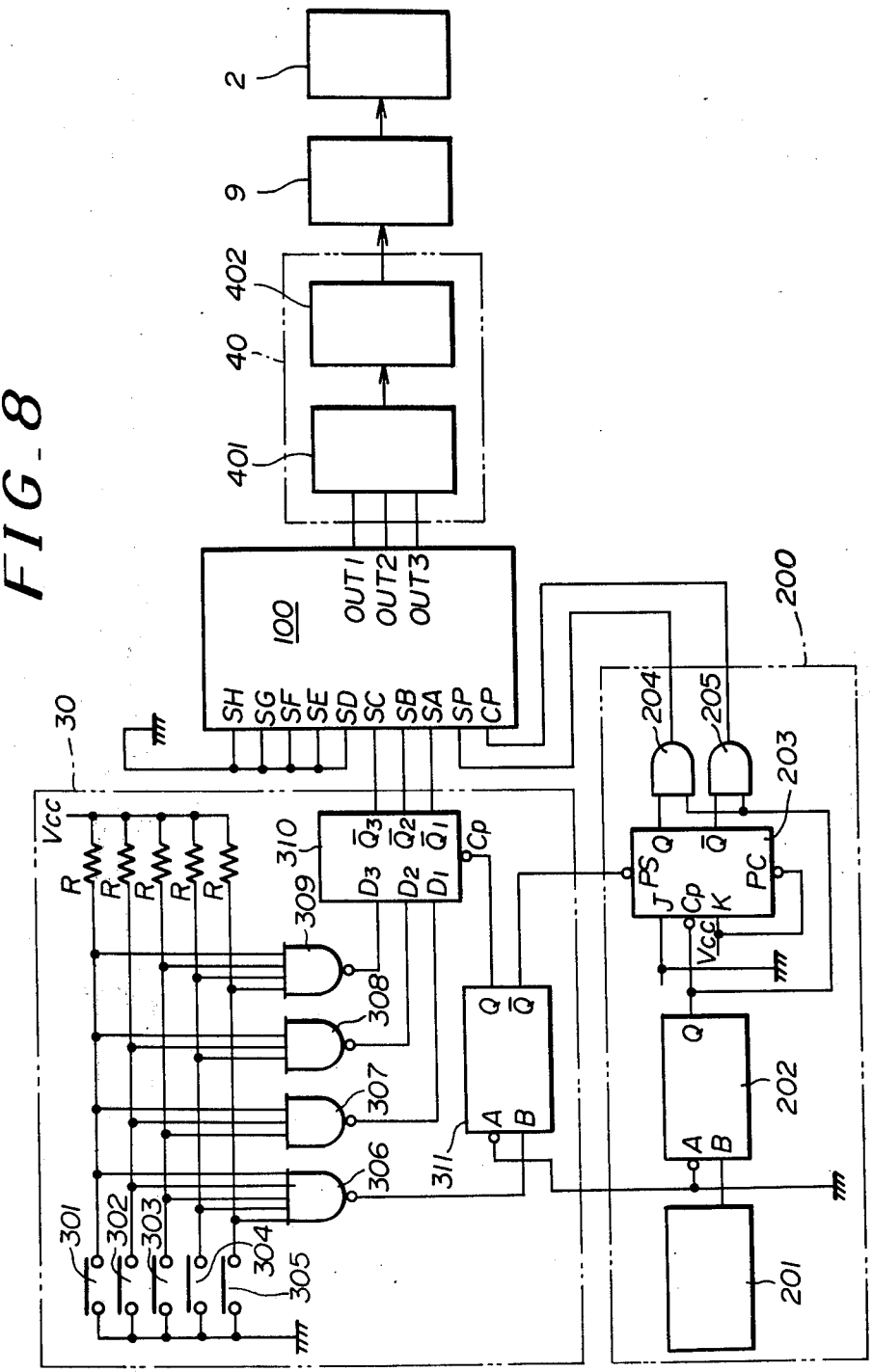

In FIG. 7, (CP) denotes the clock pulse terminal of the logic circuit for receiving a clock pulse as will be explained below, and is connected to the trigger terminals ($C_p$) of the flip-flop circuits (A) to (H). (SP) denotes a set pulse terminal for receiving a set pulse signal as will be explained below, and is connected to one of the input terminals of NAND circuits (NAND(PS.A)) to (NAND(PS.H)) and (NAND(PC.A)) to (NAND(PC.H)). (SA) to (SH) denote set data terminals, of which the terminals (SA), (SB), (SC) receive pattern selecting signals and the other terminals (SD) to (SH) are grounded as shown in FIG. 8. The set data terminals (SA) to (SH) are respectively connected to the other input terminals of the NAND circuits (NAND(PS.A)) to (NAND(PS.A)) and are also connected respectively to the other input terminals of the NAND circuits (NAND(PC.A)) to (NAND(PC.H)) via the respective inverters (INA) to (INH). The outputs of the NAND circuits (NAND(PS.A)) to (NAND(PS.H)) are connected respectively to the preset terminals (PS) of the respective flip-flop circuits (A) to (H) so that a falling signal applied to the preset terminals (PS) will set a logic value 1 at the true side output terminals (Q) of those flip-flop circuits. The output terminals of the NAND circuits (NAND(PC.A)) to (NAND(PC.H)) are connected respectively to the clearing terminals (PC) of the respective flip-flop circuits (A) to (H) so that a falling signal applied to the clearing terminals (PC) will reset to a logic value 0 at the true side output terminals (Q) of those flip-flop circuits. (OUT 1), (OUT 2), (OUT 3) denote output terminals of the logic circuit and are, as ready mentioned, connected respectively to the true side output terminals (Q) of the respective flip-flop circuits (D), (E), (F), and each is connected to an inputs of the digital-analogue converter (401) which constitutes a part of the drive circuit (400).

Now the electric control circuit in FIG. 8 will be explained. The reference numeral (30) denotes a pattern selecting device in which the pattern selecting switches (301) to (305) are each at one end thereof grounded and at one end thereof connected to the DC power source (Vcc) through respective resistors (R). The pattern selecting switches (301) to (305) are also each at the other end thereof connected to the respective input terminals of NAND circuit (306), the output of which is connected to the input terminal (B) of a monostable multivibrator circuit (311). The monostable multivibrator circuit (311) gives an output of logic value 1 from its true side output terminal (Q) each time it receives a pulse signal. The monostable multivibrator circuits (311), (202) are each commercially available units and their respective input terminals (A), (A) are jointly connected to inverted ground potential as shown.

The pattern selecting switches (301) to (305) are connected via (NAND) circuits (307), (308), (309) to the input terminals ($D_1$), ($D_2$), ($D_3$) of the latch circuit (310) as shown, so as to encode the signals of the respective switches in a three-bit arrangement. The latch circuit (310) has a trigger terminal (CP) connected to the true side output terminal of the monostable multivibrator (311). Therefore, with the falling signal at the true side output (Q), the signals at the inputs ($D_1$), ($D_2$), ($D_3$) of the latch circuit (310) are inverted and latched to the outputs ($\overline{Q}_1$), ($\overline{Q}_2$), ($\overline{Q}_3$), so as to be applied to the set data terminals (SA), (SB), (SC) of the logic circuit (100) whose other set data terminals (SD) to (SH) are grounded.

Reference numeral (20) denotes a pulse generator in which the output terminal of the Hall IC (201) is connected to the input terminal (B) of the monostable multivibrator circuit (202) which has its output terminal (Q) connected to the trigger terminal (CP) of the J-K flip-flop circuit (203), and also connected to one of the input terminals of AND circuit (204) and of AND circuit (205). The flip-flop circuit (203) has a terminal (J) which is grounded, and has a terminal (K) and a clear terminal (PC) connected to the power source (Vcc). The flip-flop circuit (203) has also a preset terminal (PS) connected to the complement output terminal ($\overline{Q}$) of the monostable multivibrator (311). The flip-flop circuit (203) is set by the falling signal at the output terminal ($\overline{Q}$), and is inverted by the falling signal at the output terminal (Q) of the monostable multivibrator circuit (202). The true side output terminal (Q) and the complement output terminal ($\overline{Q}$) of the flip-flop circuit (203) are connected respectively to the other input terminal of the AND circuit (204) and of AND circuit (205) which have outputs terminals respctively connected to the set pulse terminal (SP) and the clock pulse terminal (CP) of the logic circuit (100). The coded data issued from the output terminals ($OUT_1$), ($OUT_2$), ($OUT_3$) of the logic circuit (100) are changed to analog signals at the digital-analog converter (401) and amplified at the power amplifier (402), thereby to operate the electromagnetic driver (9) which in turn operates the link mechanism (2) controlling the lateral swinging movement of the needle (or the feeding amount and direction of the cloth feed device) as illustrated in FIG. 2. The digital-analog converter (401) and the power amplifier (402), as shown in FIG. 8, are provided in a drive circuit (400) which constitutes the drive mechanism (40) of the sewing machine.

From the foregoing explanation of this invention, if the pattern selecting switch (302) in FIG. 8 is manually closed, the input terminals ($D_1$), ($D_2$), ($D_3$) of the latch circuit (310) have logic values 1, 1, 0 respectively, and these logic values are latched in a predetermined time interval by the operation of monostable multivibrator circuit (311), and the inverted logic values 0, 0, 1 are given to the set data terminals (SA), (SB), (SC) of the logic circuit (100) respectively. Simultaneously the flip-flop circuit (203) is set.

When the sewing machine is driven and the Hall IC (201) generates a pulse, the monostable multivibrator circuit (202) is operated for a predetermined time to give a set pulse to the set data terminal (SP) of the logic circuit (100). In reference to FIG. 7, with this pulse given to the terminal (SP), the corresponding flip-flop circuit (C) is set, and the flip-flop circuits (A), (B), (D) to (H) are reset, which respectively correspond to the set data terminals (SA), (SB), (SD) to (SH). In this instance, the condition of the flip-flop circuits (A) to (H) is binary codes 00100000 respectively in the table No. 3 and in the time (n) of the three pointed zigzag stitches in FIG. 3. The stitch control information issued from the output terminals (OUT$_1$), (OUT$_2$), (OUT$_3$), which correspond to these data, drive the electro-magnetic driver (9) with the decimal number 0 of the data 0 0 0, and the needle position coordinate 0 is obtained since the condition of the flip-flop circuits (D), (E), (F) is 0 0 0.

In a predetermined time interval, when the monostable multivibrator circuit (202) ceases to generate a pulse, the flip-flop circuit (203) is reset. The flip-flop circuit (203) will not be reset again so long as the monostable multivibrator circuit (311) is not operated, namely so long as a new pattern is not selected.

When the Hall IC (201) generates a pulse again after one rotation of the main shaft (13), the monostable multivibrator circuit (202) is operated in a predetermined time interval to give a pulse to the clock pulse terminal (CP) of the logic circuit (100). With this pulse, the flip-flop circuits (A) to (H) are shifted from the condition of time (n) to the condition of time (n+1) as shown in FIG. 3 in accordance with the conditions of the input terminals (J), (K). Since the flip-flop circuits (A) to (H) are respectively 00100000 at the time (n), the condition 0 of the flip-flop circuits (A), (B) in the time (n+1) is unchanged because $J_A=0$, $K_A=0$, $J_B=0$ and $K_B=0$; the condition 1 of the flip-flop (C) is unchanged because $J_C = (F + AEGH + \overline{AEGH})^n = (0+0, 0, 0, 0 + 1, 1, 0, 0) = 0$ and $K_C = \{\overline{F}(E+\overline{G})\ (B+G+H)\ (A+E+G)\}^n = 1(0+1)\ (0+0+0)\ (0+0+0) = 1$ (in this case, n can be replaced by the data corresponding to the letters in parentheses); the condition 0 of the flip-flop circuit (D) is unchanged because $J_D = (A\overline{E}G + \overline{H} \cdot \overline{F} + A\overline{CE} + \overline{BCGH} + C\overline{EGH})^n = 0, 1, 0 + 1, 0 + 0, 0, 1 + 1, 0, 0, 0 + 1, 1, 0, 0 = 0$, and $K_D = \{(\overline{A}+E+\overline{G})\ (\overline{A}+C+\overline{E})\ (E+H)\ (\overline{C}+E+\overline{G}+\overline{H})\ (\overline{B}+F+\overline{G}+\overline{H})\}^n = (1+0+1)\ (1+1+0)\ (0+0)\ (0+0+1+1)\ (1+0+1+1)=0;$ the condition 0 of the flip-flop circuit (E) is inverted to value 1 because $J_E=(\overline{BH}+D\overline{H}+A\overline{C}+CGH+\overline{B}CD)^n = 1, 1 + 0 + 0 + 0 + 0 = 1$, and $K_E = \{(\overline{F}+H)\ B+\overline{C}+\overline{D})\}^n = (1+0)\ (0+0+1)=1;$ the condition 0 of the flip-flop circuit (F) is inverted to 1 because $J_F=(\overline{ABCG})^n = 1, 1, 1, 1 = 1$ and $K_F = 1$; the condition 0 of the flip-flop circuit (G) is unchanged because $J_G=(DEFH+\overline{AEH}+\lambda D\overline{EFH})^n=0 + 0 + 0= 0$, and $K_G=\{(E+F)\ (F+H)\ (\overline{A}+E)\}^n=0, 0, 1 = 0;$ and the condition 0 of the flip-flop circuit (H) is unchanged because $J_H=(BC\overline{E}+\overline{A} \cdot \overline{EFG}+E\overline{FG}+A\overline{CEFG}+\overline{BCD}+\overline{AB})^n= 0 + 0 + 0 + 0 + 0 + 0 = 0$, and $K_H= \{(\overline{A}+E)\ (B+\overline{C}+D)\}^n= 1, 0 = 0.$ Ultimately, the condition of flip-flop circuits (A) to (H) in the time (n+1) becomes 00101100. Since the stitch control data are 011 at the flip-flop circuits (D), (E), (F) respectively, the electromagnet driver (9) is operated to shift the needle of the sewing machine to the needle position coordinate corresponding to the decimal number 3. In the same manner, with each rotation of the main shaft, a pulse is given to the clock pulse terminal (CP) of the logic circuit (100) and the stitches are progressively and repeatedly formed as shown in FIG. 3.

From the foregoing, it will be clear that the thirty-four 8-bit words tabulated in FIG. 3 are state words, each characterizing one of thirty-four states assumed by the circuit of FIG. 7, and that each 8-bit state word, appearing on the Q outputs of flip-flop A–H, comprises a 3-bit stitch control word, appearing in particular on the Q outputs of flip-flops D, E, F.

Thus in this invention, as aforementioned, each of the patterns in FIG. 3 is formed by a series of binary codes which are never used in the other patterns. Therefore, it has become possible to form a specific pattern such as a buttonhole with the first and second type of succeeding stitches, namely, with the bar-tack stitches and the subsequent line-tack stitches.

We claim:
1. In a sewing machine, in combination,
   stitch-forming means operative for changing the relative positions of the needle and the material being sewn in the course of sewing a stitch pattern;
   drive means operative for controlling the stitch-forming means in dependence upon received stitch-control data;
   pulse-generating means generating synchronizing pulses in synchronism with the operation of a cyclically operative component of the sewing machine;
   logic circuit means operative in response to successive synchronizing pulses for generating and applying to the drive means stitch-control data for successive stitches of the stitch-pattern to be sewn but without storing simultaneously all the stitch-control data for all the stitches of the stitch pattern to be sewn,
   the logic circuit means assuming successive states in response to successive synchronizing pulses,
   the logic circuit means when in its successive states producing successive state data, each state data comprising stitch-control data for a stitch of the stitch pattern,
   the logic circuit, in performing transitions to successive states, generating and thereby bringing into existence the state data for successive states by deriving it from the state data of preceding states.
2. In a sewing machine as defined in claim 1, further comprising pattern-selecting means operable by the user for selecting a stitch pattern from a plurality of stitch patterns by selecting the states through which the logic circuit means will run in response to the synchronizing pulses.
3. In a sewing machine as defined in claim 1,
   the logic circuit, in performing transitions to successive states, generating and thereby bringing into existence the state data for successive states by deriving it at least in part from the stitch-control data contained within the state data of preceding states.
4. In a sewing machine as defined in claim 1,
   the state data for each state assumed by the logic circuit means consisting of a multi-bit word,
   the logic circuit means including a plurality of signal-producing elements each having an input and an output and each producing at its output a signal constituting a respective bit of the multi-bit word, the logic circuit means furthermore including a combinational-logic network comprising a plurality of logic gates interconnecting the outputs and inputs of plural different combinations of said signal-producing elements.

5. In a sewing machine as defined in claim 4, said signal-producing elements being flip-flops.

6. In a sewing machine as defined in claim 5, said flip-flops being clocked flip-flops clocked in response to the synchronizing pulses.

7. In a sewing machine as defined in claim 4, the multi-bit words constituting the state data for the states assumed by the logic circuit means each comprising but not entirely consisting of a plurality of stitch-control bits constituting the stitch-control data, the bits constituting the stitch-control data being produced at the outputs of only predetermined ones of said signal-producing elements, the outputs of said predetermined ones of the signal-producing elements constituting the outputs of the logic circuit means and being connected to the drive means, the remaining bits in each of said multi-bit words constituting extra bits.

8. In a sewing machine as defined in claim 7, said extra bits comprising bits provided so that all the multi-bit words can be different from one another irrespective of whether the stitch-control data for each stitch in the stitch pattern is different from the stitch-control data for all the other stitches in the stitch pattern, all the multi-bit words being different from one another.

9. In a sewing machine as defined in claim 7, further comprising pattern-selecting means operable by the user for selecting a stitch pattern from a plurality of stitch patterns by selecting the states through which the logic circuit means will run is response to the synchronizing pulses, said extra bits comprising predetermined bits constituting a pattern-correlated word, the value assumed by the pattern-correlated word for any one of the stitch-patterns always being different from the values assumed by the pattern-correlated word for any and all of the other stitch patterns.

10. In a sewing machine as defined in claim 4, further comprising pattern-selecting means operable by the user for selecting a stitch pattern from a plurality of stitch patterns by selecting the states through which the logic circuit means will run in response to the synchronizing pulses, the pattern-selecting means comprising means establishing the signals produced at the outputs of at least predetermined ones of said signal-producing elements at least for the state of the logic circuit means corresponding to the first stitch of the selected pattern.

* * * * *